United States Patent [19]

Kumaki et al.

[11] Patent Number: 5,451,626
[45] Date of Patent: Sep. 19, 1995

[54] POLYESTER COMPOSITIONS CONTAINING ARYL ETHER COMPOUNDS

[75] Inventors: Jiro Kumaki; Kiyomi Okita, both of Nagoya; Hidetoshi Ohtawa, Mishima, all of Japan

[73] Assignee: Eastman Chemical Company, Kingsport, Tenn.

[21] Appl. No.: 84,837

[22] Filed: Jun. 29, 1993

[30] Foreign Application Priority Data

Jun. 30, 1992 [JP] Japan ................... 4-173204

[51] Int. Cl.$^6$ .................. C08K 5/06; C08K 5/15; C08K 5/5333; C08K 5/524
[52] U.S. Cl. .................... 524/370; 524/114; 524/128; 524/135; 524/147; 524/151; 524/153; 524/366; 524/371; 524/372; 524/375; 524/378; 524/605
[58] Field of Search .............. 524/366, 370, 372, 375, 524/135, 147, 151, 153, 114, 605, 128, 378, 371

[56] References Cited

U.S. PATENT DOCUMENTS

| | | | |
|---|---|---|---|
| 2,901,466 | 6/1959 | Kibler et al. | 525/425 |
| 3,356,646 | 3/1965 | Wynstra et al. | 528/88 |
| 3,959,213 | 5/1976 | Gilkey et al. | 524/147 |
| 4,295,886 | 10/1981 | Gresham | 524/371 |
| 4,474,914 | 10/1984 | Spivack | 524/135 |
| 4,533,679 | 8/1985 | Rawlings | 524/605 |
| 4,536,531 | 8/1985 | Ogawa et al. | 524/135 |
| 4,713,407 | 12/1987 | Bailey et al. | 524/605 |
| 4,837,254 | 4/1989 | Branscome | 524/605 |
| 4,859,732 | 7/1989 | Minnick | 524/605 |
| 4,894,404 | 10/1990 | Minnick | 524/605 |
| 5,162,091 | 11/1992 | Ishii et al. | 524/370 |
| 5,187,212 | 2/1993 | Gray | 524/375 |

FOREIGN PATENT DOCUMENTS

| | | | |
|---|---|---|---|
| 0328528 | 3/1987 | European Pat. Off. | |
| 0273149 | 6/1987 | European Pat. Off. | |
| 0491947 | 7/1992 | European Pat. Off. | 524/372 |

OTHER PUBLICATIONS

H. A. Pohl, *Analytical Chemistry*, 1954, 26, pp. 1614–1616.
Derwent Abstract, JP 3009948, 1991.
Derwent Abstract, PCT 9106602, 1991.
Derwent Abstract, JP 2187451, 1990.
Derwent Abstract, JP 2500033, 1990.
Derwent Abstract, JP 63221159, 1988.
Derwent Abstract, JP 62270653, 1987.

*Primary Examiner*—Peter A. Szekely
*Attorney, Agent, or Firm*—Karen A. Harding; Harry J. Gwinnell

[57] ABSTRACT

This invention relates to a polyester composition comprising
a) a polyester having repeat units from terephthalic acid and 1,4-cyclohexane dimethanol, said polyester having an I.V. of 0.5–2.0 g/dL, and
b) about 1–10% by weight of the total composition of an ether compound having the formula wherein R and R' having from about 1 to about 30 carbon atoms are univalent hydrocarbon radicals, A and A' having from about 6 to about 18 carbon atoms are aromatic radicals, and —X— is a chemical bond or divalent coupling radical.

27 Claims, No Drawings

POLYESTER COMPOSITIONS CONTAINING ARYL ETHER COMPOUNDS

FIELD OF THE INVENTION

This invention relates to poly(1,4-cyclohexylenedimethylene terephthalate) compositions which have good melt flow, low cycle times in injection molding, good weld-line strength and good melt stability. The compositions contain certain aryl ether compounds, optionally with a multifunctional epoxy-based or epoxy-derived compound and a phosphate or phosphonite compound wherein at least one of the P—O oxygens is attached to an aryl radical.

BACKGROUND OF THE INVENTION

Compositions based on poly(1,4-cyclohexylenedimethylene terephthalate), PCT, are useful as injection molding compounds for applications such as electrical/electronic parts, automotive parts, and mechanical parts, owing to their excellent physical properties, chemical resistance, and heat resistance. The heat resistance of PCT compositions is higher than that which can be obtained with common thermoplastic polyesters such as poly(ethylene terephthalate), PET, and poly(butylene terephthalate), PBT. However, for thin-walled parts, PCT is deficient in crystallization rate and melt flow. Further, the high processing temperature needed for PCT causes the molecular weight of the polymer to degrade during injection molding, which in turn causes a decrease in physical properties. These problems prevent the wider use of PCT as a molding material.

Solutions suggested to the first problem, that of low crystallization rate, have included the use of long chain alcohols (U.S. Pat. No. 4,859,732), amide compounds (U.S. Pat. No. 4,894,404) and toluene sulfonamide (Japan Kokai H2-187451). Normal plasticizers do not provide sufficient increase in the crystallization rate for good processability. Also, they are volatile and thus cause problems in mold corrosion, charring due to volatile gases, and loss of physical properties.

Regarding the problem of degradation during injection molding, it has been previously disclosed to add epoxy compounds to a similar terephthalate-based polyester, PET. It has also been previously disclosed to add trifunctional phenol-type epoxy compounds, trifunctional isocyanuric acid-based compounds (EP-A-0273149), phenoxy resin (U.S. Pat. No. 4,837,254) and glycidyletherester compounds (Japan Kokai H3-9948) to PET.

The use of certain epoxy compounds in PCT is disclosed in EP-A-273149. This application also discloses the use of a phosphate compound as a component of a formulation. Phosphates are not within the scope of the present invention. The use of other epoxy/phosphorous combinations are disclosed in WO 9106602.

The addition of stabilizers to a blend of a PCT-type copolyester and polycarbonate has been disclosed (Japan Kokai S62-270653).

The use of heat stabilizers to avoid color formation during heat aging of PCT copolyesters (EP-A-0328528) is also known.

Known epoxy compounds have sometimes been effective in avoiding a drop in apparent viscosity due to degradation. However, it is difficult to avoid a loss of physical properties when a drop in molecular weight occurs. It is also difficult to obtain stable processing performance, for example, during injection molding. This is due to the polymer branching which occurs as a result of the continuing reaction between the multifunctional epoxy and the polymer melt in the injection molding machine. This branching causes changes in the flow characteristics of the polymer. Thus it is not possible to obtain sufficient melt stability using only the known epoxies.

Unexpectedly, a suitable plasticizer for PCT has been discovered which improves crystallization rate and melt flow without lowering physical properties and which has a much lower level of volatile off-gas.

Further, use of specific phosphorous compounds with this plasticizer gives synergistic improvements in melt stability. Use of combinations of the plasticizer with phosphorous compounds and with multifunctional epoxy compounds dramatically improves the physical properties, especially after exposure of the PCT in a molten state to long residence times in an injection molding machine.

SUMMARY OF THE INVENTION

According to the present invention there is provided a polyester molding composition comprising
a) a polyester containing repeat units derived from terephthalic acid and 1,4-cyclohexanedimethanol and having an inherent viscosity from about 0.5 to 2.0 g/dL,
b) about 0.1–10% by weight of the total composition of an ether compound having the formula

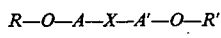

$$R-O-A-X-A'-O-R'$$

wherein R and R' are univalent hydrocarbon radicals, A and A' are aryl radicals, and —X— is a chemical bond or divalent coupling radical.

DETAILED DESCRIPTION OF THE PREFERRED EMBODIMENTS

The polymerization method used to prepare the poly(1,4-cyclohexylene dimethylene terephthalate) useful in the invention is not particularly limited. It is typical to polycondense terephthalic acid or its alkyl esters with 1,4-cyclohexanedimethanol. Polymerization conditions are given, for example, in U.S. Pat. No. 2,901,466.

The dicarboxylic acid component of the PCT may contain up to about 20 mol %, preferably up to 10 mol %, of other conventional dicarboxylic acids such as isophthalic acid, phthalic acid, 2-6-naphthalenedicarboxylic acid, 2,7-naphthalenedicarboxylic acid, 1,5-naphthalenedicarboxylic acid, methylphthalic acid, 4,4-diphenyldicarboxylic acid, 2,2'-biphenyldicarboxylic acid, 1,2-bis(4-carboxyphenoxy)ethane, succinic acid, adipic acid, suberic acid, azelaic acid, sebacic acid, dodecanedicarboxylic acid, octadecanedicarboxylic acid, dimer acid, and 1,4-cyclohexanedicarboxylic acid.

The glycol component of the PCT may contain up to about 20 mol %, preferably 10 mol %, of other conventional glycols such as ethylene glycol, propylene glycol, 1,5-pentanediol, 1,6-hexanediol, 1,8-octanediol, 1,3-cyclohexanedimethanol, 1,2-cyclohexanedimethanol, 2,2-bis(2'-hydroxyethoxyphenyl)propane, etc.

The 1,4-cyclohexanedimethanol used in the PCT has a cis/trans ratio in the range of 60/40 to 10/90, preferably 50/50 to 15/85, and more preferably 40/60 to 25/75. If the level of cis isomer is greater than about 60 mol %, the melting point of the polyester is reduced too much for use in heat resistant applications. If the level of trans isomer is greater than about 90 mol %, the melting point increases too close to the degradation point and molding becomes impractical.

The polyesters and copolyesters described above should have an I.V. (inherent viscosity) of about 0.5–2.0 dL/g, preferably about 0.5–1.0 dL/g. At lower values, the physical properties of the polymer are adversely affected. At higher values, processability becomes difficult.

Carboxyl ends in the PCT polymer should be less than 100 eq/$^6$ g of polymer, preferably less than 30 and more preferably less than 15. This value can be determined according to the method of H. A. Pohl, *Analytical Chemistry*, 26, 1614–1616 (1954).

The chemical formula of component b) of this invention, the aryl ether compound, is generally represented by the formula

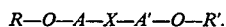

R—O—A—X—A'—O—R'.

R and R' represent univalent hydrocarbon radicals, including aliphatic, alicyclic and aromatic radicals. Aliphatic radicals are preferred. Specific examples of aliphatic radicals are methyl, ethyl, propyl, butyl, pentyl, hexyl, octyl, decyl, dodecyl, and octadecyl. Examples of alicyclic radicals are cyclohexyl and methylcyclohexyl. Examples of aromatic radicals are phenyl, benzyl and naphthyl. Of these, aliphatic radicals having 5–22 carbon atoms, e.g. octyl, dodecyl, and octadecyl are especially preferred.

A and A' are aromatic radicals of having about 6 to 18 carbon atoms, for example, benzene, naphthalene, and biphenylene. More preferred aromatic radicals are p-phenylene, m-phenylene, and o-phenylene.

An even more preferred aromatic radical is p-phenylene.

—X— represents a chemical bond alkylene group or a divalent coupling radical having about 1 to about 8 carbon atoms. Examples of divalent coupling radicals are alkylene groups ether, thioether and sulfonyl. Preferred divalent coupling radicals are 2,2-propylidene, methylene, ethylidene, cyclohexylidene, and sulfonyl. Even more preferred divalent coupling radicals are 2,2-propylidene and sulfonyl.

—O—A—X—A'—O— of the above formula is commercially produced. The substituted radical which eliminates hydrogen from a bisphenol is inexpensive and easy to handle. Examples of bisphenols are bisphenol-A, bisphenol-S, bisphenol-F, and bisphenol-E.

The concentration of the ether compound is 0.1–10 weight %, and preferably 0.5–5 weight %. At levels below 0.1 weight %, the improvements in crystallization rate and melt flow are insufficient. At levels above 10 weight %, physical properties are decreased.

Optionally, an organic phosphite or phosphonite wherein at least one of the P—O oxygens is attached to an aryl radical having about 6–30 carbon atoms may be added at a level of 0.05–2 weight % to improve melt stability. Further improvement in melt stability may be obtained by the addition of 0.05–2 weight % of a multifunctional epoxy compound.

The phosphorous-based compound used in this invention is either a phosphite or a phosphonite or a mixture of both, wherein at least one of the P—O oxygens is attached to an aryl radical.

Such compounds may be represented by the formulas

where at least one of $R_1$, $R_2$ and $R_3$ is an aryl radical of 6 to 30 carbon atoms such as phenyl, nonylphenyl, butyl phenyl, butyl methylphenyl, biphenyl and octylphenyl, and any other(s) of $R_1$, $R_2$ and $R_3$ are H or alkyl of 1 to 30 carbon atoms, such as methyl, ethyl, propyl, butyl, pentyl, hexyl, octyl, decyl, dodecyl, octadecyl, cyclohexyl, isopropyl, isononyl, isooctyl and the like or

wherein $R_3$, $R_4$ and $R_5$ are as defined for $R_1$, $R_2$ and $R_3$ above.

Examples of these compounds are: tris-(2,4-di-t-butylphenyl)phosphite; tetrakis-(2,4-di-t--butylphenyl)-4,4'-biphenylene phosphite; bis-(2,4-di-t-butylphenyl)-pentaerythritol diphosphite; bis-(2,6-di-t-butyl-4-methylphenyl)pentaerythritol diphosphite; 2,2-methylene-bis(4,6-di-t-butylphenyl)octylphosphite; 4,4'-butylidene-bis(3-methyl-6-t-butylphenyl-di-tridecyl)-phosphite; 1,1,3-tris-(2-methyl-4-tridecylphosphite-5-t-butylphenyl)butane; tris-(mixed mono- and di-nonylphenyl)phosphite; tris-(nonylphenyl)-phosphite; and 4,4'-isopropylidenebis-(phenyl-dialkyl-phosphite).

Preferred compounds are tris-(2,4-di-t-butylphenyl)-phosphite; 2,2-methylenebis-(4,6-di-t-butylphenyl)-octylphosphite; bis-(2,6-di-t-butyl-4-methylphenyl)pentaerythritol diphosphite, and tetrakis-(2,4-di-t-butylphenyl)-4,4'-biphenylenephosphonite.

The epoxy compound used in this invention has two or more epoxy groups per molecule. If there is only one epoxy group per molecule, the epoxy compound is not effective for improving melt stability, which is an objective of this invention. A compound containing only one epoxy group per molecule can reduce molecular weight loss from hydrolysis by decreasing the number of carboxyl ends in the PCT. However, it is preferable to use an epoxy compound having three or more epoxy groups per molecule and even more preferably, three to five epoxy groups per molecule. This allows for increased melt stability to be obtained with a minimal concentration of epoxy compound.

Preferably, the epoxy compound used in the present invention is selected from the group consisting of
1) aromatic hydrocarbon compounds having at least 3 epoxide groups, including monomers, oligomers or polymers of up to 10 monomer units
2) polymers derived from a diepoxide monomer of the formula

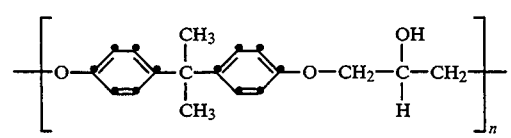

wherein n is about 50 to 200, or 3) oligomers having 2 to about 15 repeat units of diglycidyl ethers having the formula

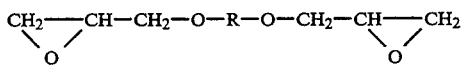

wherein R is an aromatic radical of 6–15 carbon atoms.

Preferably, the compounds of 1) above have the structural formula

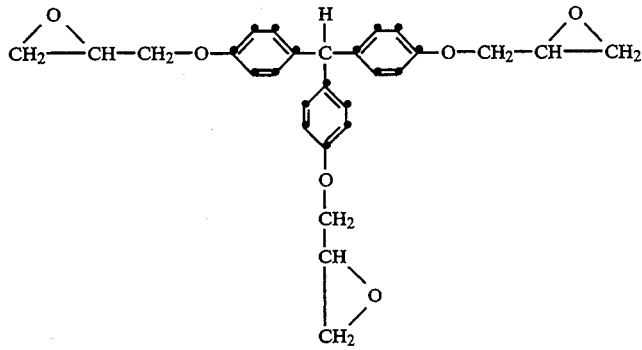

or

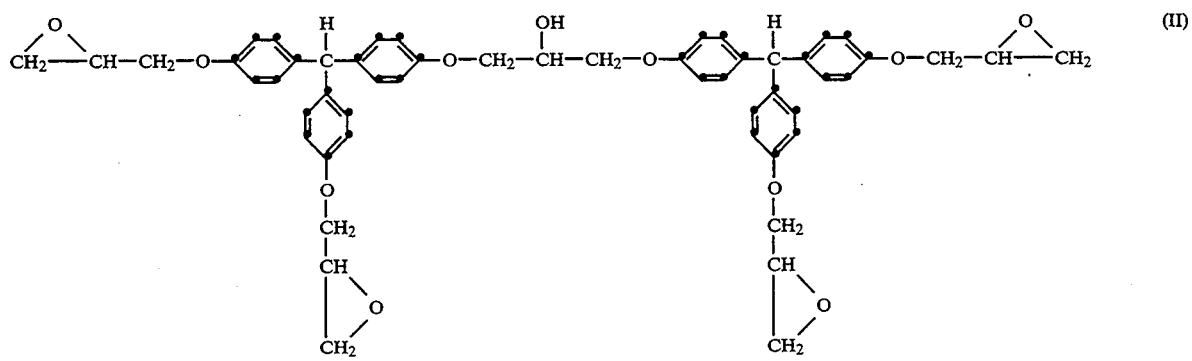

or are the reaction products of up to five moles of compound I with one mole of compound II. Commercially available compounds described in 1) include epoxylated novolac, tris(4-glycidyloxyphenyl)methane and polymers thereof, available from Dow Chemical Company.

The diepoxide monomer referred to in 2) above has the structural formula

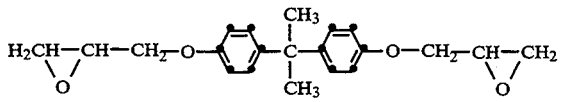

Preferably R in 3) above is

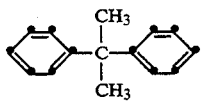

Examples of polymers described in 2) above include the polyhydroxyether of bisphenol A (commonly known as phenoxy) which is produced from 2,2'-bis(4-hydroxyphenyl) propane and epichlorohydrin. Preparation of such polymers is described in U.S. Pat. No. 3,356,646.

Commercially available compounds described in 3) include Epon oligomers of diglycidyl ether, available from Shell Chemical Company. These compounds have two reactive epoxy groups and at least one secondary hydroxyl group per molecule.

In the case of compositions based on common polyester resins such as PET and PBT, use of an epoxy compound having more than three functional groups results in a strong cross-linking reaction that causes an increase in viscosity and gelation. This in turn leads to reductions in physical and mechanical properties. This cross-linking reaction has been used to make these resins suitable for processing by extrusion and blow molding.

PCT is different from PBT and PET, however, in that its decomposition rate is relatively rapid at the processing temperature. Thus, the effect of the epoxy compound is somewhat different in PCT, where it can be just effective enough to avoid the drop in physical properties which would accompany a decrease in molecular weight.

Examples of effective epoxy compounds are: the diglycidylethers of aliphatic diols such as 1,6-hexanediol, neopentyl glycol, and polyalkylene glycols; the polyglycidylethers of aliphatic polyols such as sorbitol, sorbitane, polyglycerol, pentaerythritol, diglycerol, and glyceryl trimethylolpropane; the polyglycidylethers of alicyclic polyols; the diglycidylester or polyglycidylester of aliphatic or aromatic multi-functional carboxylic acids such as terephthalic acid, isophthalic acid, naphthalenedicarboxylic acid, trimellitic acid, adipic acid, and sebacic acid; the diglycidyl ether or polyglycidyl ether of multifunctional phenols such as resorcinol, bis-(p-hydroxyphenyl)methane, 2,2-bis-(p-hydroxyphenyl)propane, tris-(p-hydroxyphenyl methane), and 1,1,2,2-tetrakis-(p-hydroxyphenyl)ethane; the N-glycidyl derivatives of amines such as N,N-diglycidyl-aniline, N,N-diglycidyltoluidine, and N,N,N',N'-tetraglycidyl-bis-p-aminophenyl)methane; triglycidyl derivatives of aminophenol; triglycidyl-tris-2-hydroxyethyl- )isocyanurate; ortho-cresol type epoxies and phenol-novolac type epoxies.

The most effective compounds among the above are the polyglycidylethers of aliphatic polyols, the triglycidylether of tris-(p-hydroxyphenyl)ethane, the tetraglycidylether of 1,1,2,2-tetrakis-(p-hydroxyphenyl)ethane, and triglycidyl-tris-(2-hydroxyphenyl)isocyanurate. The epoxy compound can be added in a monomeric form, or in the form of a condensed oligomer/polymer, or as a mixture. The polymerization degree is preferably 1–20, more preferably 1–10. Mixtures of different epoxy compounds are also possible. The methods used to make the epoxy compounds are not restricted. Typical methods are disclosed in the references cited above, as well as in *Encyclopedia of Polymer Science and Engineering*, published by John Wiley and Sons.

The level of epoxy compound used in this invention should be in the range of 0.05–5 weight %, preferably 0.1–3 weight %, based on 100 weight % of the total PCT formulation. If a level of less than 0.05 weight % is used, the improvement in stability is insufficient. If more than 5 weight % is used, the physical properties of the PCT are decreased. Among the epoxy compounds, the glycidylester type and the N-substituted glycidyl derivatives have higher reactivities compared to the glycidylether types; thus, they can be used at lower levels. For optimum processability, melt. stability, and thermal stability during drying, the amount of epoxy compound should be adjusted to about 30 equivalents/$10^6$ grams of polymer, preferably 20 equivalents/$10^6$ grams of polymer.

The combination of a multifunctional epoxy compound with the specified phosphorous compounds has a synergistic effect on the melt stability of PCT and avoids loss of mechanical properties resulting from long residence times in the melt, as may occur in an injection molding machine. It is believed that the combination of additives suppresses the chain branching that occurs when the multifunctional epoxy is used alone, and this is responsible for the improved performance.

It is possible to use the epoxy compounds disclosed above with hydrolytic stabilizers such as oxazolines, carboxyimides and azylidines.

It is also possible to use reinforcing materials in this invention. These can be fiber, bead or flake types, i.e. glass fiber, glass beads, glass flake, carbon fiber, ceramic fiber, asbestos, wollastonite, talc, clay, mica, celicite, zeolite, bentonite, dolomite, kaolin, silicates, powdered feldspar, potassium titanate, calcium carbonate, magnesium carbonate, barium sulfate, calcium oxide, aluminum oxide, titanium oxide, aluminum silicate, silicon dioxide, plaster, novacurite, dosonite and white earth. These can be used individually or in mixtures of two or more types. Preferred are glass fiber, glass beads, wollastonite, mica, clay, and talc. Reinforcing materials may be used at levels of 5–60 wt. %.

The composition of this invention can also include one or more of the following: antioxidants, ultraviolet stabilizers, heat stabilizers, lubricants, mold release agents, dyes, coloring agents including pigments, impact modifiers, flame retardants, and the like. These additives should be present at levels that do not affect the main purpose of the invention.

It is desirable to include a nucleating agent as a component of this invention to further improve the processability. Preferred nucleating agents are metal salts of aliphatic carboxylic acids such as sodium stearate and barium stearate; sodium montanate; the sodium salt of benzoic acid and its derivatives; the sodium salt of salicylic acid; the sodium salts of substituted phenols such as nitrophenol, salicylaniline and salicylaldehyde; the sodium salt of copolymers of ethylene and acrylic acid or methacrylic acid; and inorganic powders such as talc and clay.

It is also possible to add small amounts of other polymers such as polyethylene, acrylics, fluorocarbons, polyamides, poly(ethylene terephthalate), poly(butylene terephthalate), poly(phenylene sulfide), polyetheretherketone, liquid crystal polyester, polyacetal, polycarbonates, polysulfones, polyphenylene oxides, thermoset resins (for example phenol, melamine, polyester, silicone, or epoxy resins), ethylene/vinyl acetate copolymers, polyester elastomers, ethylene/propylene terpolymers, and the like.

Compounding of the aryl ether compound, the multifunctional epoxy compound and the organic phosphorous compound into PCT can be accomplished by any convenient method, though extrusion is typically used. The compounding temperature.must be above the melting point of the PCT resin. Parts from the compositions of this invention can be formed by known methods such as injection molding and extrusion. Such parts have excellent mechanical properties and chemical resistance which make them suitable for use in applications such as electrical/electronics, automotive, mechanical, and other intricate moldings.

As used herein, the inherent viscosity (I.V.) of the polyester is measured at 25° C. using 0.5 g of polymer per 100 mL of a solvent consisting of 60% by weight phenol and 40% by weight tetrachloroethane. The intrinsic viscosity of the polyphenylene ether is measured at 25° C. in chloroform.

The invention can be further illustrated by the following examples of preferred embodiments thereof, although it will be understood that these examples are included merely for purposes of illustration and are not intended to limit the scope of the invention unless otherwise specifically indicated. All percentages are by weight, unless otherwise specified.

EXAMPLES 1–9

Examples 1–8 are examples of the invention. Example 9 is a comparative example.

In the following examples, all compositions are given in weight %. The following materials were used:
PCT 0.81 I.V.; cis/trans ratio of CHDM 30/70; carboxyl ends = 12 equivalents/$10^6$ g polymer
35 weight % chopped strand glass fiber (10 micron diameter, 3 mm length)
0.5 weight % talc
Ether Compound

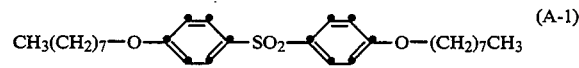

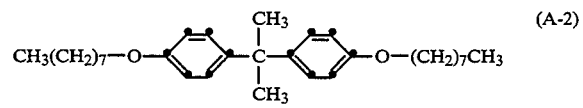

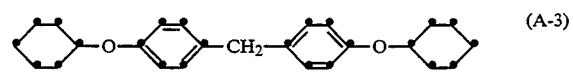

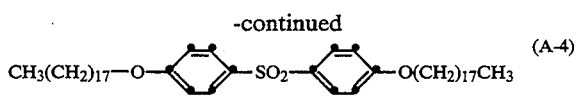

(A-4) CH₃(CH₂)₁₇—O—⟨⟩—SO₂—⟨⟩—O(CH₂)₁₇CH₃

Epoxy Tetraglycidylether of 1,1,2,2-tetrakis-(p-hydroxyphenyl)ethane (B-1) Triglycidyl-tris-(2-hydroxyethyl)-isocyanurate (B-2) Triglycidylether of tris-(p-hydroxyphenyl)methane (B-3) Pentaerythritol tetraglycidylether (B-4)

Phosphorous Compound Bis-(2,4-di-t-butyl-4-methylphenyl)-pentaerythritol diphosphite (C-1)

2,2-Methylene-bis-( 4,6-di-t-butylphenyl )octylphosphite (C-2 )

Tetrakis-(2,4-di-t-butylphenyl)-4,4'biphenylphosphonite (C-3)

Crystallization rate was measured by determining the crystallization temperature on heating (Tch) and on cooling (Tcc) using a Perkin-Elmer Differential Scanning Calorimeter. It is well known in the art that higher Tch's or lower Tcc's indicate faster crystallization rates. Thus the value $\Delta T = Tch - Tcc$ can be used as a measure of crystallization rate.

The set temperature of the compounding extruder was 300° C. After compounding, the polyester composite was dried at 130° C. for four hours. Sample bars (ASTM type I dumbbell, ⅛" thick, with and without weld) were molded on a screw-in-line type injection molding machine having a 75 MT clamping force. Mold temperature was 120° C. and the cycle time was 30 sec. Also, to determine the effect of residence time in the molding machine, samples without a weld-line were molded using a cycle time of 120 sec. Tensile tests were done according to ASTM D638.

Processability was evaluated by determining the minimum cycle time to mold a small box, 100 mm × 50 mm × 30 mm × 2 mm thick.

Results are shown in Table 1, where it can be seen that, surprisingly, improved weld-line strengths and cycle times are obtained with the compositions of this invention (those containing the ether compounds). Further, the addition of a multifunctional epoxy compound and a specific phosphorous compound improves the mechanical properties and the melt stability. Compositions of this invention have an excellent combination of heat resistance, melt flow, cycle time, weld-line strength, and melt stability making them useful for applications in the areas of electrical/electronics, automotive, mechanical and structural parts.

TABLE 1

| | Ether Compound | | Multi-functional Epoxy Compound | | Phosphorus Compound | | ΔT (°C.) | Cycle Time (30 sec.) Tensile Strength [kg/cm²] | | Cycle Time (120 sec.) Tensile Strength [kg/cm²] | Min. Cycle Time (sec.) |
|---|---|---|---|---|---|---|---|---|---|---|---|
| | Type | Wt. % | Type | Wt. % | Type | Wt. % | | W/Weld | W/O Weld | W/O Weld | |
| Act. Example | | | | | | | | | | | |
| 1 | A-1 | 3.5 | — | — | — | — | 123 | 1110 | 520 | 810 | 15 |
| 2 | A-1 | 3.5 | B-1 | 0.5 | — | — | 117 | 1290 | 570 | 920 | 28 |
| 3 | A-1 | 3.5 | — | — | C-1 | 0.25 | 123 | 1210 | 540 | 900 | 14 |
| 4 | A-1 | 3.5 | B-1 | 0.5 | C-1 | 0.25 | 123 | 1310 | 620 | 1110 | 13 |
| 5 | A-2 | 3.5 | B-2 | 0.5 | C-2 | 0.25 | 122 | 1310 | 610 | 1140 | 16 |
| 6 | A-3 | 3.5 | B-3 | 0.5 | C-3 | 0.25 | 123 | 1330 | 620 | 1140 | 13 |
| 7 | A-4 | 3.5 | B-4 | 0.5 | C-1 | 0.25 | 126 | 1340 | 620 | 1120 | 15 |
| 8 | A-4 | 3.5 | B-3 | 0.5 | C-1 | 0.25 | 124 | 1310 | 610 | 1150 | 14 |
| Com. Example 9 | — | — | B-1 | 0.5 | C-1 | 0.25 | 113 | Impossible to Mold | | 1100 | 60 |

Act. Ex. = Actual Example
Com. Ex. = Comparison Example
Ether Compound

A-1: 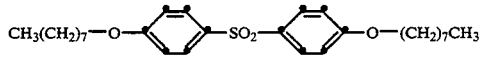

A-2: 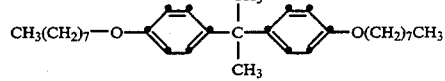

A-3: 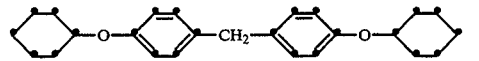

A-4: 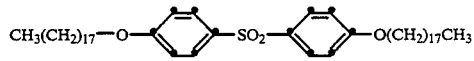

Epoxy Compound
B-1: tetraglycidylether of 1,1,2,2-tetrakis-(p-hydroxyphenyl)ethanol
B-2: triglycidyl tris (2-hydroxyethyl)isocyanurate
B-3: triglycidylether of tris-(p-hydroxyphenyl)methane
B-4: pentaerythritol tetraglycidylether
Phosphorus Compound
C-1: bis (2,4-di-t-butyl-4-methylphenyl)pentaerythritoldiphosphite
C-2: 2,2-methylene-bis(4,6-di-t-butylphenyl)octylphosphite
C-3: tetrakis (2,4-di-t-butylphenyl)-4,4'-biphenylphosphonite The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. An injection moldable polyester composition comprising
   a) a polyester having repeat units derived from terephthalic acid and 1,4-cyclohexane dimethanol, said polyester having an I.V. of 0.5–2.0 g/dL, as measured at 25° C. using 0.5 g of polymer per 100 mL of a solvent consisting of 60% by weight phenol and 40% by weight tetrachloroethane, and
   b) about 1–10% by weight of the total composition of an ether compound having the formula $$R-O-A-X-A'-O-R'$$

wherein R and R' having from about 1 to about 30 carbon atoms are univalent hydrocarbon radicals, A and A' having from about 6 to about 18 carbon atoms are aromatic radicals selected from the group consisting of benzene, naphthalene and biphenylene, and —X— is a chemical bond, alkylene group or divalent coupling radical.

2. The polyester composition of claim 1 wherein said polyester is poly(1,4-cyclohexylenedimethylene terephthalate).

3. The polyester composition of claim 2 wherein said 1,4-cyclohexanedimethanol has a cis/trans ratio in the range of 60/40 to 10/90.

4. The polyester composition of claim 1 wherein said polyester contains carboxyl ends which are less than about 100 eq/$10^6$ g of polymer.

5. The polyester composition of claim 1 wherein said univalent hydrocarbon radicals include aliphatic, alicyclic or aromatic radicals.

6. The polyester composition of claim 5 wherein said univalent hydrocarbon radical is aliphatic.

7. The polyester composition of claim 6 wherein said aliphatic radical has from about 5 to about 22 carbon atoms.

8. The polyester composition of claim 7 wherein said aliphatic radicals are selected from the group consisting of octyl, dodecyl, and octadecyl.

9. The polyester composition of claim 1 wherein either or both of said A and A' are selected from the group consisting of benzene, naphthalene, biphenylene, p-phenylene, m-phenylene, and o-phenylene.

10. The polyester composition of claim 9 wherein either or both of said A or A' are p-phenylene.

11. The polyester composition of claim 1 wherein said —X— divalent coupling radical is selected from the group consisting of alkylene group, ether, thioether, sulfonyl, 2,2-propylidene, methylene, ethylidene, cyclohexylidene and sulfonyl.

12. The polyester composition of claim 11 wherein said divalent coupling radical is selected from the group consisting of 2,2-propylidene, methylene, ethylidene, cyclohexylidene, and sulfonyl.

13. The polyester composition of claim 12 wherein said divalent coupling radical is selected from the group consisting of 2,2-propylidene and sulfonyl.

14. The polyester composition of claim 1 further comprising a phosphite, a phosphonite compound, or a mixture thereof.

15. The polyester composition of claim 1 further comprising an organic phosphite or phosphonite compound wherein at least one of the P—O oxygen is attached to an aryl radical.

16. The polyester composition of claim 15 wherein said organic phosphite compound is represented by the formula:

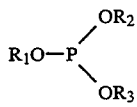

where at least one of $R_1$, $R_2$ and $R_3$ is an aryl radical of 6 to 30 carbon atoms and any other of $R_1$, $R_2$ and $R_3$ are H or alkyl of 1 to 30 carbon atoms.

17. The polyester composition of claim 15 wherein said organic phosphonite compounds is represented by the formula

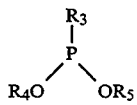

where at least one of $R_3$, $R_4$ and $R_5$ is an aryl radical of 6 to 30 carbon atoms and any other of $R_3$, $R_4$ and $R_5$ are H or alkyl of 1 to 30 carbon atoms.

18. The polyester composition of claim 16 wherein said organic phosphite compound is selected from the group consisting of tris-(2,4-di-t-butylphenyl)phosphite; 2,2-methylenebis--(4,6-bi-t-butylphenyl)octylphosphite; and bis-(2,6-di-t-butyl-4-methylphenyl)pentaerythritol diphosphite.

19. The polyester composition of claim 17 wherein said organic phosphonite compound is tetrakis-(2,4-di-t-butylphenyl)-4,4'-biphenylenephosphonite.

20. The polyester composition of claim 15 wherein the total level for either or both of said phosphite or phosphonite compounds is in the range of about 0.5–2.0 weight %.

21. The polyester composition of claim 1 further comprising a multifunctional epoxy compound.

22. The polyester composition of claim 21 wherein said epoxy compound contains at least two or more epoxy groups per molecule.

23. The polyester composition of claim 22 wherein said epoxy compound contains three or more epoxy groups per molecule.

24. The polyester composition of claim 23 wherein said epoxy compound contains three to five epoxy groups per molecule.

25. The polyester composition of claim 22 wherein said epoxy compound is selected from the group consisting of tetraglycidylether of 1,1,2,2-tetrakis-(p-hydroxy-phenyl)ethane, and triglycidyl-tris-(2-hydroxyphenyl)-isocyanurate.

26. The polyester composition of claim 22 wherein said epoxy compound is selected from the group consisting of N-glycidyl derivatives of amines and diglycidylesters or polyglycidyesters of aliphatic or aromatic multi functional carboxylic acids.

27. The polyester composition of claim 21 wherein said epoxy compound is present in the amount of 0.1–0.3 weight % based on the total composition.

* * * * *

UNITED STATES PATENT AND TRADEMARK OFFICE
CERTIFICATE OF CORRECTION

PATENT NO. : 5,451,626
DATED : September 19, 1995
INVENTOR(S) : Jiro Kumaki, Kiyomi Okita, Hidetoshi Ohtawa It is certified that error appears in the above-indentified patent and that said Letters Patent is hereby corrected as shown below:

Column 11, line 61 (Claim 11), "-X-" should be deleted.

Signed and Sealed this

Thirtieth Day of January, 1996

Attest:

BRUCE LEHMAN

*Attesting Officer*    *Commissioner of Patents and Trademarks*